(12) United States Patent
Nagasawa et al.

(10) Patent No.: US 10,480,607 B2
(45) Date of Patent: Nov. 19, 2019

(54) VIBRATION-DAMPING DEVICE

(71) Applicant: BRIDGESTONE CORPORATION, Tokyo (JP)

(72) Inventors: Masakazu Nagasawa, Tokyo (JP); Akira Ueki, Tokyo (JP); Yasuyuki Nagashima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/557,878

(22) PCT Filed: Jan. 25, 2016

(86) PCT No.: PCT/JP2016/052040
§ 371 (c)(1),
(2) Date: Sep. 13, 2017

(87) PCT Pub. No.: WO2016/147698
PCT Pub. Date: Sep. 22, 2016

(65) Prior Publication Data
US 2018/0073591 A1   Mar. 15, 2018

(30) Foreign Application Priority Data
Mar. 19, 2015 (JP) ................................. 2015-056079

(51) Int. Cl.
*F16F 13/10* (2006.01)
(52) U.S. Cl.
CPC ............ *F16F 13/107* (2013.01); *F16F 13/10* (2013.01)
(58) Field of Classification Search
CPC ......... F16F 13/10; F16F 13/105; F16F 13/107

USPC ..................................................... 188/140.13
See application file for complete search history.

(56) References Cited

U.S. PATENT DOCUMENTS

| 4,676,489 A |   | 6/1987  | Hofmann et al. |
| 4,708,329 A | * | 11/1987 | Tabata ................... F16F 13/10 267/140.13 |
| 4,739,978 A | * | 4/1988  | Bodin .................. F16F 13/107 188/320 |

(Continued)

FOREIGN PATENT DOCUMENTS

| DE | 8524406 U1 | 7/1987 |
| DE | 3844810 C2 | 6/1995 |

(Continued)

OTHER PUBLICATIONS

International Search Report of PCT/JP2016/052040 dated Mar. 8, 2016 [PCT/ISA/210].

(Continued)

*Primary Examiner* — Thomas J Williams
(74) *Attorney, Agent, or Firm* — Sughrue Mion, PLLC

(57) ABSTRACT

The present invention is a liquid-tight the vibration-damping device (10). In this vibration-damping device (10), a limiting passage (24) includes a main body passage (25) disposed inside a partition member (16), a first communication section (26) configured to communicate the main body passage (25) and a first liquid chamber (14), and a second communication section (27) configured to communicate the main body passage (25) with a second liquid chamber (12). At least one of the first communication section (26) and the second communication section (27) includes openings (31).

7 Claims, 12 Drawing Sheets

(56) References Cited

U.S. PATENT DOCUMENTS

| | | | | |
|---|---|---|---|---|
| 4,787,610 A | * | 11/1988 | Kojima | F16F 13/20 188/317 |
| 4,903,951 A | * | 2/1990 | Miyamoto | F16F 13/103 267/140.13 |
| 2007/0057421 A1 | * | 3/2007 | Nanno | F16F 13/105 267/140.13 |
| 2014/0367192 A1 | * | 12/2014 | Kim | F16F 13/10 181/161 |
| 2016/0053846 A1 | * | 2/2016 | Nagasawa | B60K 5/1208 267/140.13 |
| 2016/0131219 A1 | | 5/2016 | Ueki et al. | |

FOREIGN PATENT DOCUMENTS

| | | |
|---|---|---|
| EP | 0150824 A2 | 8/1985 |
| GB | 2206176 A | 12/1988 |
| JP | 63-066643 U | 5/1988 |
| JP | 01-113645 U | 7/1989 |
| JP | 01-224544 A | 9/1989 |
| JP | 2007-182930 A | 7/2007 |
| JP | 2010-169160 A | 8/2010 |
| JP | 2012-172832 A | 9/2012 |
| WO | 2014/196284 A1 | 12/2014 |
| WO | 2014196520 A1 | 12/2014 |

OTHER PUBLICATIONS

Written Opinion of PCT/JP2016/052040 dated Mar. 8, 2016 [PCT/ISA/237].

Communication dated Mar. 2, 2018, from the European Patent Office in counterpart European Application No. 16764529.0.

Communication dated Sep. 3, 2018, from State Intellectual Property Office of the P.R.C. in counterpart application No. 2016800155599.

\* cited by examiner

VIBRATION-DAMPING DEVICE

TECHNICAL FIELD

The present invention relates to a vibration-damping device which is applied to, for example, an automobile, industrial machinery, and the like and absorbs and attenuates vibrations of a vibration generating section such as an engine. Priority is claimed on Japanese Patent Application No. 2015-056079, filed Mar. 19, 2015, the content of which is incorporated herein by reference.

BACKGROUND ART

In a related art, a type of vibration-damping device includes a tubular first attachment member joined to one of a vibration generating section and a vibration receiving section, a second attachment member joined to the other of the vibration generating section and the vibration receiving section, an elastic body configured to join the attachment members, an elastic body configured to connect the two attachment members, and a partition member configured to partition a liquid chamber in the first attachment member in which a liquid is sealed into a main liquid chamber and a sub-liquid chamber. A limiting passage configured to bring the main liquid chamber into communicate with the sub-liquid chamber is formed in the partition member. In the vibration-damping device, the attachment members are relatively displaced while elastically deforming the elastic body when receiving vibrations, and thus a hydraulic pressure of the main liquid chamber changes. This causes the liquid to flow through the limiting passage, thereby absorbing and attenuating the vibrations.

However, in the vibration-damping device, when a load is input in an opposite direction due to a rebound or the like of the elastic body, for example, after a large load is input due to an unevenness or the like of a path surface, and the hydraulic pressure of the main liquid chamber rapidly increases, the main liquid chamber is rapidly depressurized in some cases. Thus, cavitation in which many bubbles are generated in the liquid due to the rapid depressurization is generated, and an abnormal noise is generated due to a cavitation collapse in which the generated bubbles collapse in some cases. Therefore, a valve body is provided in the limiting passage, as in, for example, the vibration-damping device disclosed in Patent Document 1, so that depressurization of the main liquid chamber can be prevented even when vibrations with large amplitudes are input.

CITATION LIST

Patent Document

Patent Document 1
Japanese Unexamined Patent Application, First Publication No. 2012-172832

SUMMARY OF INVENTION

Technical Problem

However, in such a conventional vibration-damping device, since the valve body is provided so that a structure of the conventional vibration-damping device is complicated and the valve body also needs to be tuned, manufacturing costs increase. Furthermore, since a degree of freedom of a design decreases due to the valve body being provided, vibration-damping characteristics are also likely to be degraded.

The present invention was made in view of the above-described circumstances, and an objective of an aspect of the present invention is to provide a vibration-damping device which can suppress generation of an abnormal noise caused by a cavitation collapse without degrading vibration-damping characteristics by using a simple structure.

Solution to Problem

In order to accomplish such an objective, the present invention proposes the following means. The present invention is a liquid-tight vibration-damping device which includes: a tubular first attachment member joined to one of a vibration generating section and a vibration receiving section; a second attachment member joined to the other of the vibration generating section and the vibration receiving section; an elastic body configured to elastically join the first attachment member and the second attachment member; a partition member configured to partition a liquid chamber in the first attachment member in which a liquid is sealed into a first liquid chamber and a second liquid chamber; and a limiting passage formed in the partition member and configured to communicate the first liquid chamber and the second liquid chamber, wherein the limiting passage includes: a main body passage disposed in the partition member and defined by a first wall of the partition member which faces the first liquid chamber and a second wall thereof which faces the second liquid chamber; a first communication section configured to communicate the main body passage and the first liquid chamber; a second communication section configured to communicate the main body passage and the second liquid chamber, and at least one of the first communication section and the second communication section passes through the first wall or the second wall and has openings disposed in a passage direction of the main body passage.

In this case, the first attachment member and the second attachment member are relatively displaced while elastically deforming the elastic body when receiving vibrations so that a hydraulic pressure of the first liquid chamber is changed and a liquid is caused to pass through the limiting passage and flow between the first liquid chamber and the second liquid chamber. At this time, the liquid passes through one of the first communication section and the second communication section and flows into the main body passage. After that, the liquid passes through the other of the first communication section and the second communication section to flow outside of the main body passage. Here, when a large load (vibration) is input to the vibration-damping device and the liquid passes through the openings, which are included in the first communication section and the second communication section, and flows through main body passage, the liquid flows through the openings while a pressure of the liquid decreases due to the first wall or the second wall in which the openings are formed. Thus, an increase in flow rate of the liquid flowing through the openings can be suppressed. In addition, since the liquid flows through not a single opening but the openings, the liquid can branch into flows, and a flow rate of the liquid which passes through the openings can be reduced. Thus, a difference in flow rates generated between the liquid which passes through the openings and flows into the first liquid chamber or the second liquid chamber and the liquid in the first liquid chamber or the second liquid chamber is suppressed to be small, and generation of a vortex due to the difference in the flow rates and generation of bubbles due to the vortex can be suppressed. In addition, even when bubbles are generated, since the openings are disposed in the passage direction, the generated bubbles can be separated in the passage direction, and a combination and growth of the bubbles are prevented so that the bubbles can be easily maintained in a state the bubbles are finely dispersed. As described above, the generation of the bubbles can be suppressed. In addition, even when bubbles are generated, the bubbles can be easily maintained in the state in which the bubbles are finely dispersed so that generation of an abnormal noise can be suppressed to be small even when a cavitation collapse in which the bubbles collapse occurs.

Advantageous Effects of Invention

According to the present invention, generation of an abnormal noise due to a cavitation collapse can be suppressed without degrading vibration-damping characteristics by using a simple structure.

DESCRIPTION OF EMBODIMENTS

An embodiment of a vibration-damping device according to the present invention will be described below on the basis of FIGS. 1 to 3. Note that reference symbol O (hereinafter simply referred to as an "axial center O") shown in FIG. 1 indicates a central axis of a vibration-damping device 10 (a central axis of a first attachment member 11, which will be described below). Furthermore, a direction along the axial center O is set as an "axial direction" (an axial direction of the first attachment member 11). In a plan view of the vibration-damping device 10 viewed from the axial direction, a direction orthogonal to the axial center O is set as a "radial direction" (a radial direction of the first attachment member 11), and a direction around the axial center O is set as a "circumferential direction" (a circumferential direction of the first attachment member 11).

Figure 1:
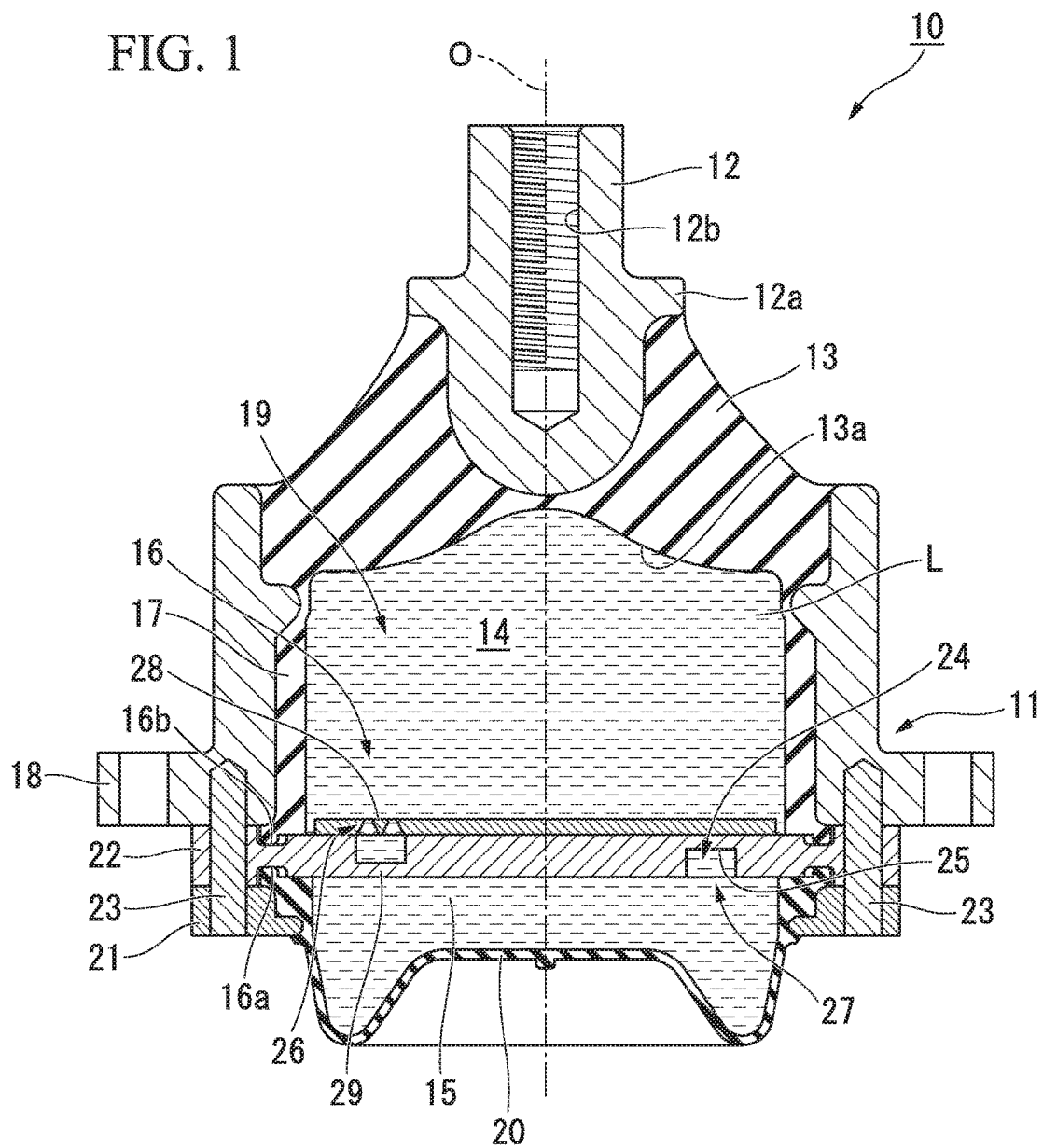
FIG. 1 is a longitudinal cross-sectional view of a vibration-damping device according to an embodiment of the present invention.

As shown in FIG. 1, the vibration-damping device 10 includes the tubular first attachment member 11 joined to any one of a vibration generating section and a vibration receiving section, a second attachment member 12 joined to the other of the vibration generating section and the vibration receiving section, an elastic body 13 configured to elastically join the first attachment member 11 and the second attachment member 12, and a partition member 16 configured to partition an inside of the first attachment member 11 into a main liquid chamber 14 and a sub-liquid chamber 15, which will be described below. Note that such members are formed to have circular shapes or annular shapes in a plan view, and are disposed to be coaxial with the axial center O. Furthermore, hereinafter, in the axial direction, the second attachment member 12 side is referred to as an upper side, and the partition member 16 side is referred to as a lower side.

When the vibration-damping device 10 is mounted in, for example, an automobile, the second attachment member 12 is joined to an engine serving as the vibration generating section and the first attachment member 11 is joined to an automobile body serving as the vibration receiving section. Thus, a transfer of vibration of the engine to the automobile body can be prevented.

The second attachment member 12 is a columnar member extending in the axial direction and has a lower end portion formed to have a hemispherical shape, and a flange 12a formed above the lower end portion. A screw hole 12b extending downward from an upper end surface of an upper portion of the second attachment member 12 penetrates into the upper portion of the second attachment member 12, and a bolt (not shown) serving as an attaching tool included in the engine is screwed into the screw hole 12b. Furthermore, the second attachment member 12 is disposed on an upper end opening side of the first attachment member 11 via the elastic body 13.

The elastic body 13 is a rubber body which is bonded with an inner circumferential surface of the upper end opening of the first attachment member 11 and an outer circumferential surface of a lower end side of the second attachment member 12 in a vulcanization manner and is sandwiched therebetween, and closes the upper end opening of the first attachment member 11 from above. An upper end portion of the elastic body 13 abuts the flange 12a of the second attachment member 12 and comes into sufficiently close contact with the second attachment member 12 such that the elastic body 13 more satisfactorily follows displacement of the second attachment member 12. Furthermore, a rubber membrane 17 configured to liquid-tightly cover the inner circumferential surface and a part of a lower end surface of the first attachment member 11 is provided on a lower end portion of the elastic body 13, and the rubber membrane 17 is integrally formed with the elastic body 13. Note that, as the elastic body 13, an elastic body made of rubber, a synthetic resin, or the like can also be used.

The first attachment member 11 is a cylindrical member having a flange 18 on a lower end portion thereof and is joined to the automobile body or the like serving as the vibration receiving section via the flange 18. Upper end openings of the first attachment member 11 are closed by the elastic body 13 as described above, and a liquid chamber 19 is formed below the first attachment member 11. In this embodiment, the partition member 16 is provided near lower end openings of the first attachment member 11, and a diaphragm 20 is provided below the partition member 16.

The diaphragm 20 is a closed-bottom cylindrical member made of an elastic material such as rubber and a soft resin. In addition, an open end of an upper portion of the diaphragm 20 is liquid-tightly engaged with an annular attaching groove 16a formed in the partition member 16, and an outer circumferential portion of an upper end of the diaphragm 20 is pressed against the partition member 16 by a ring-shaped holding tool 21 in this state. A flange section 22 is formed on an outer circumference of the partition member 16, and the holding tool 21 abuts the flange section 22.

With such a constitution, the flange section 22 and the holding tool 21 of the partition member 16 abut an opening edge of a lower end of the first attachment member 11 in the stated order, and are fixed to the first attachment member 11 by screws 23 such that the diaphragm 20 is attached to the lower end openings of the first attachment member 11 via the partition member 16. Note that, in this embodiment, a bottom portion of the diaphragm 20 is recessed such that depth of an outer circumference side of the diaphragm 20 is deep and depth of a central portion of the diaphragm 20 is shallow. Here, as a shape of the diaphragm 20, various conventionally known shapes can be adopted in addition to such a shape.

The diaphragm 20 is attached to the first attachment member 11 via the partition member 16 in this way so that the liquid chamber 19 is formed inside the first attachment member 11 as described above. The liquid chamber 19 is arranged inside the first attachment member 11, that is, inside the first attachment member 11 in a plan view, and is provided between the elastic body 13 and the diaphragm 20 in a liquid-tightly closed state. Moreover, a liquid L is sealed in the liquid chamber 19 (the liquid chamber 19 is filled with the liquid L).

The liquid chamber 19 is partitioned into the main liquid chamber 14 and the sub-liquid chamber 15 by the partition member 16. A lower end surface 13a of the elastic body 13 is formed as a part of a wall surface of the main liquid chamber 14. The main liquid chamber 14 is a space surrounded by the rubber membrane 17, which is configured to liquid-tightly cover the elastic body 13 and the inner circumferential surface of the first attachment member 11, and the partition member 16. An inner capacity of the main liquid chamber 14 changes in accordance with deformation of the elastic body 13. The sub-liquid chamber 15 is a space surrounded by the diaphragm 20 and the partition member 16. An inner capacity of the sub-liquid chamber 15 changes in accordance with deformation of the diaphragm 20. The vibration-damping device 10 is a compression type device in which the main liquid chamber 14 is attached to and located on an upper side of the vibration-damping device 10 in a vertical direction and the sub-liquid chamber 15 is attached to and located on a lower side of the vibration-damping device 10 in the vertical direction and used.

A holding groove 16b configured to liquid-tightly hold a lower end portion of the rubber membrane 17 on an upper surface of the main liquid chamber 14 side is formed in the partition member 16. Thus, a space between the rubber membrane 17 and the partition member 16 is liquid-tightly closed. Furthermore, a limiting passage 24 configured to communicate the main liquid chamber 14 and the sub-liquid chamber 15 is provided in the partition member 16.

Figure 2:
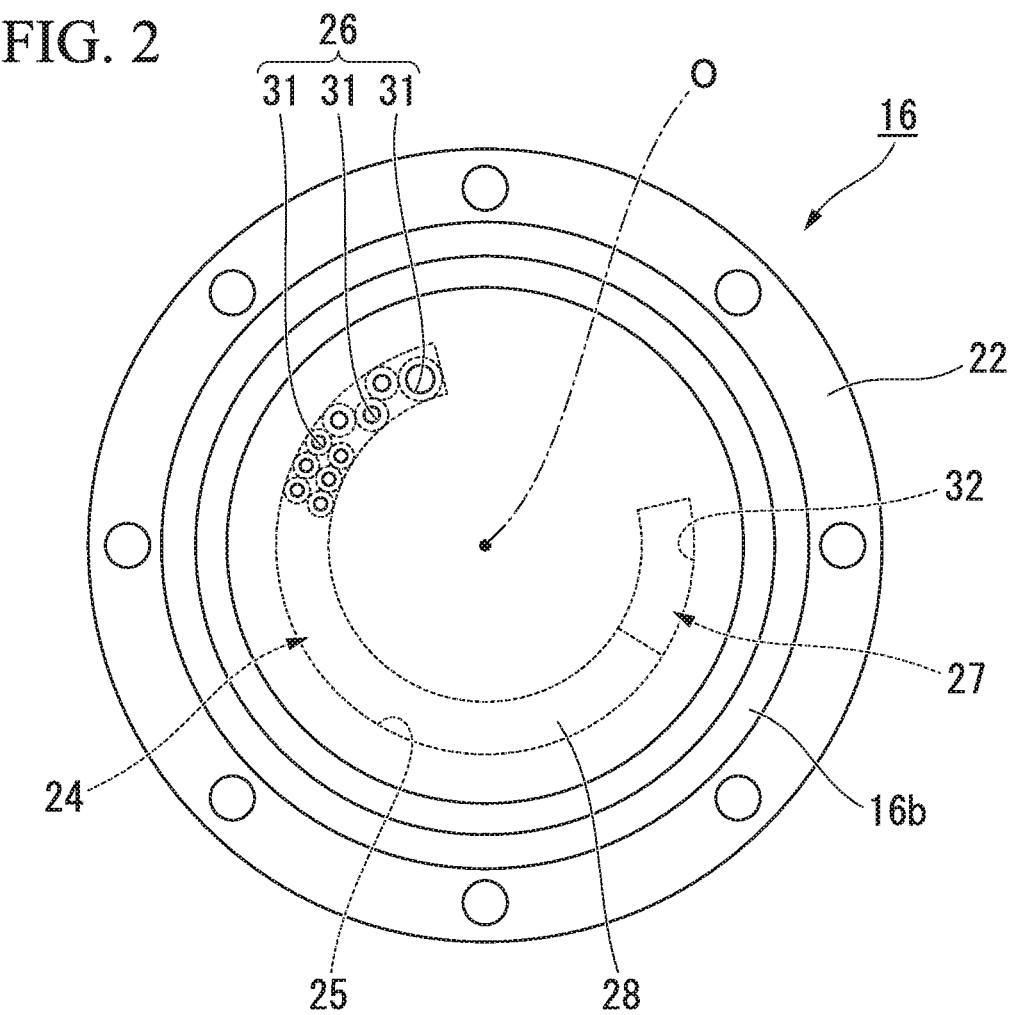
FIG. 2 is a plan view of a partition member constituting the vibration-damping device shown in FIG. 1.
Figure 3:
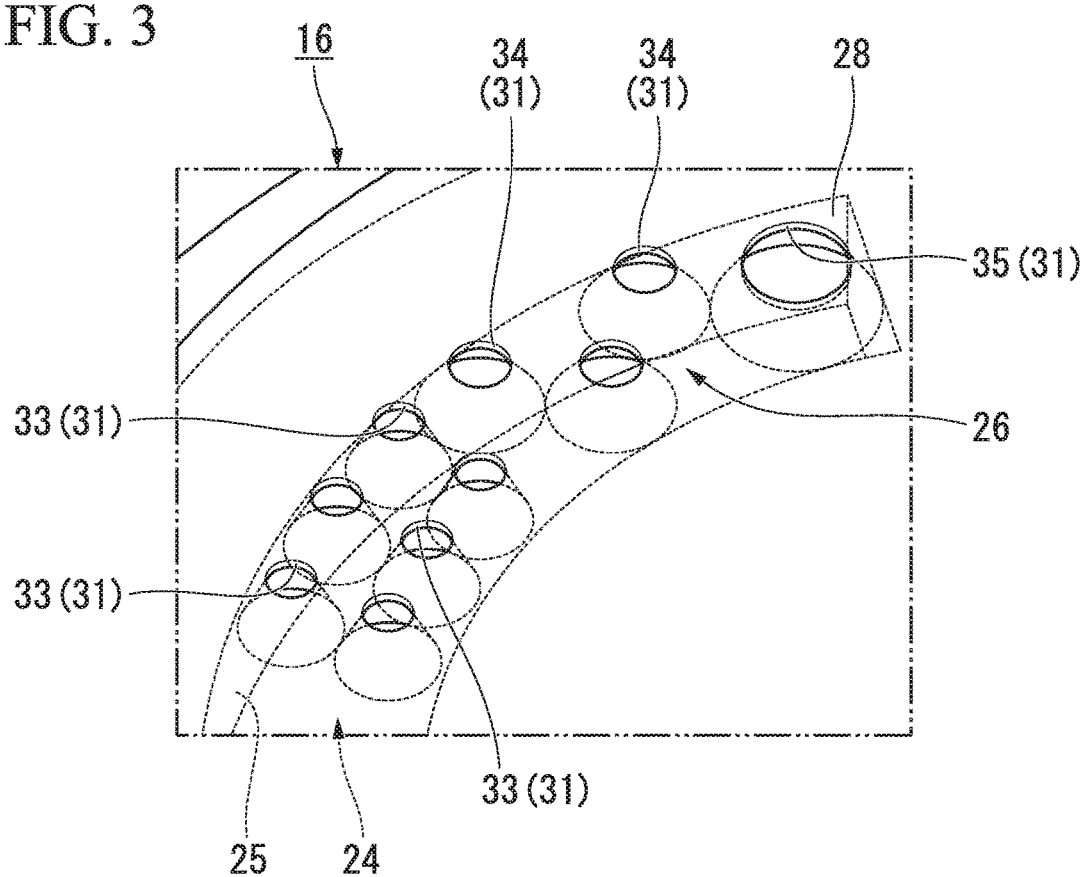
FIG. 3 is an enlarged perspective view of a main section of the partition member shown in FIG. 1.

As shown in FIGS. 1 to 3, the limiting passage 24 includes a main body passage 25 disposed inside the partition member 16, a first communication section 26 configured to communicate the main body passage 25 and the main liquid chamber 14, and a second communication section 27 configured to communicate the main body passage 25 and the sub-liquid chamber 15. The main body passage 25 extends inside the partition member 16 in the circumferential direction, and a passage direction of the main body passage 25 and the circumferential direction are the same direction. The main body passage 25 is formed on a circular arc disposed to be coaxial with the axial center O, and extends over substantially half of a circumference of the circular arc in the circumferential direction. The main body passage 25 is defined by a first wall 28 of the partition member 16 which faces the main liquid chamber 14 and a second wall 29 of the partition member 16 which faces the sub-liquid chamber 15. Each of the first wall 28 and the second wall 29 is formed in a plate shape in which front surfaces and rear surface thereof face in the axial direction. The first wall 28 is sandwiched by the main body passage 25 and the main liquid chamber 14 in the axial direction, and is located between the main body passage 25 and the main liquid chamber 14. The second wall 29 is sandwiched by the main body passage 25 and the sub-liquid chamber 15 in the axial direction, and is located between the main body passage 25 and the sub-liquid chamber 15.

The second communication section 27 has one opening passing through the second wall 29 in the axial direction (hereinafter referred to as a "second opening 32"). The second opening 32 is disposed in a portion of the second wall 29 which forms one end portion of the main body passage 25 in the circumferential direction. The first communication section 26 has openings which pass through the first wall 28 in the axial direction and are disposed in the circumferential direction (the passage direction of the main body passage 25) (hereinafter referred to as "first openings 31"). The first openings 31 are disposed on a portion of the first wall 28 which forms the other end portion of the main body passage 25 in the circumferential direction. Hereinafter, in the circumferential direction, the one end portion side of the main body passage 25 is referred to as one side, and the other end portion side of the main body passage 25 is referred to as the other side.

The first openings 31 are all smaller than the main body passage 25 in a radial direction, and are formed inside the first wall 28 in a plan view. Minimum values of flow path cross-sectional areas of the first openings 31 gradually increase as the first openings 31 recede from the second opening 32 in the circumferential direction, that is, from one side toward the other side, in the circumferential direction (the passage direction of the main body passage 25). As shown in FIG. 3, small diameter openings 33, medium diameter openings 34, and a large diameter opening 35 are provided as the first openings 31 from the one side toward the other side in the circumferential direction. In the illustrated example, the small diameter openings 33, the medium diameter openings 34, and one large diameter opening 35 are provided as the first openings 31.

Diameters of all of the small diameter openings 33, the medium diameter openings 34, and the large diameter opening 35 gradually decrease toward the main liquid chamber 14, that is, from an inside of the liquid chamber 14 toward the outside in the axial direction. All of the small diameter openings 33, the medium diameter openings 34, and the large diameter opening 35 are formed to have truncated cone shapes which have 30 degree taper angles. Open ends on an outside in the axial direction, of all of the first openings 31, have the smallest flow path cross-sectional areas. Minimum values of the flow path cross-sectional areas in all of the first openings 31, that is, opening areas of, the open ends on the outside in the axial direction, of all of the first openings 31 (hereinafter referred to as "open ends"), are 25 mm$^2$ or less, and are preferably 2 mm$^2$ or more and 17 mm$^2$ or less.

In the illustrated example, open ends of the first openings 31 are formed to have circular shapes in a plan view in which the partition member 16 is viewed from the axial direction, and an inner diameter of the open end is 0.3 mm or more and 4.0 mm or less. In the first openings 31, inner diameters of open ends of the small diameter openings 33 are set to be 1.6 mm, inner diameters of open ends of the medium diameter openings 34 are set to be 2.5 mm, and an inner diameter of an open end of the large diameter opening 35 is set to be 4.0 mm.

Here, a flow path cross-sectional area of the entire first communication section 26 obtained by summing the minimum values of the flow path cross-sectional areas in all of the first openings 31 is preferably 1.8 times or more and 4.0 times or less a minimum value of a flow path cross-sectional area in the main body passage 25. Note that, in the illustrated example, the flow path cross-sectional area in the main body passage 25 is the same over a whole length of the main body passage 25.

In the above-described vibration-damping device 10, the attachment members 11 and 12 are relatively displaced while elastically deforming the elastic body 13 when vibrations are received. Thus, a hydraulic pressure of the main liquid chamber 14 changes, the liquid L in the main liquid chamber 14 passes through the limiting passage 24 and flows into the sub-liquid chamber 15, and the liquid L in the sub-liquid chamber 15 passes through the limiting passage 24 and flows into the main liquid chamber 14. In other words, some of the liquid L in the sub-liquid chamber 15 returns to the main liquid chamber 14. At this time, for example, the main liquid chamber 14 is depressurized so that some of the liquid L is evaporated, bubbles are generated, and cavitation is collapsed.

According to the vibration-damping device 10 according to this embodiment, when the liquid L flows via the first openings 31 from the main body passage 25, the liquid L flows through the first openings 31 while a pressure of the liquid L decreases due to the first wall 28 in which the first openings 31 are formed so that an increase in a flow rate of the liquid L flowing through the first openings 31 can be suppressed. In addition, since the liquid L flows through not a single first opening 31 but the first openings 31, the liquid L can branch into flows and flow so that the flow rate of the liquid L which passes through the first openings 31 can be reduced. Thus, a difference in flow rates generated between the liquid L which passes through the first openings 31 and flows into the main liquid chamber 14 and the liquid L in the main liquid chamber 14 is suppressed to be small, and generation of a vortex due to the difference in the flow rates and generation of bubbles due to the vortex can be suppressed. Even when bubbles are generated, since the first openings 31 are disposed in the circumferential direction (the passage direction of the main body passage 25), the generated bubbles can be separated in the circumferential direction. Thus, a combination and growth of the bubbles are prevented so that the bubbles can be easily maintained in a state in which the bubbles are finely dispersed. As described above, the generation of the bubbles can be suppressed. In addition, even when bubbles are generated, the bubbles can be easily maintained in the state in which the bubbles are finely dispersed so that generation of an abnormal noise can be suppressed to be small even when a cavitation collapse in which the bubbles collapse occurs.

Also, since the minimum values of the flow path cross-sectional areas of the first openings 31 are 25 mm$^2$ or less, the above-described actions and effects can be reliably attained. Moreover, when the flow path cross-sectional area of the entire first communication section 26 is 1.8 times or more and 4.0 times or less the minimum value of the flow path cross-sectional area in the main body passage 25, an abnormal noise generated when cavitation is collapsed can be efficiently reduced while space efficiency is secured. In other words, when the flow path cross-sectional area of the entire first communication section 26 is smaller than a value which is 1.8 times the minimum value of the flow path cross-sectional area in the main body passage 25, it is likely to be difficult to effectively to reduce the abnormal noise generated when the cavitation is collapsed. Furthermore, when the flow path cross-sectional area of the entire first communication section 26 is more than a value which is 4.0 times the minimum value of the flow path cross-sectional area in the main body passage 25, it is likely that a large space in which the first communication section 26 is disposed has to be secured.

In addition, diameters of the first openings 31 gradually decrease from an inside toward the outside thereof in the axial direction. Therefore, for example, when bubbles generated in the limiting passage 24 flow through the first openings 31 toward the main liquid chamber 14, the bubbles can be reliably divided into fine bubbles. Thus, generation of an abnormal noise can be effectively suppressed.

Also, since the minimum values of the flow path cross-sectional areas of the first openings 31 gradually increase as the first openings 31 recede from the second communication section 27 in the circumferential direction (the passage direction of the main body passage 25), the flow path cross-sectional areas of the first openings 31 which are away from the second communication section 27 in the circumferential direction can be increased. Thus, characteristics of the limiting passage 24 can be easily secured. Moreover, the minimum values of the flow path cross-sectional areas of the first openings 31 gradually increase as the first openings recede from the second communication section 27 in the circumferential direction instead of the minimum values of the flow path cross-sectional areas gradually decreasing as the first openings recede from the second communication section 27 in the circumferential direction. Therefore, when the liquid L in the main body passage 25 which has passed through the second communication section 27 passes through the first openings 31 and flows into the main liquid chamber 14, the liquid L can be dispersed through the first openings 31 and flow into the main liquid chamber 14 instead of the liquid L intensively flowing into the main liquid chamber 14 through the first openings 31 near the second communication section 27 among the first openings 31. Thus, the above-described actions and effects can be reliably attained.

Note that the technical scope of the present invention is not limited to the embodiment but various modifications may be made without departing from the spirit of the present invention.

Figure 4:
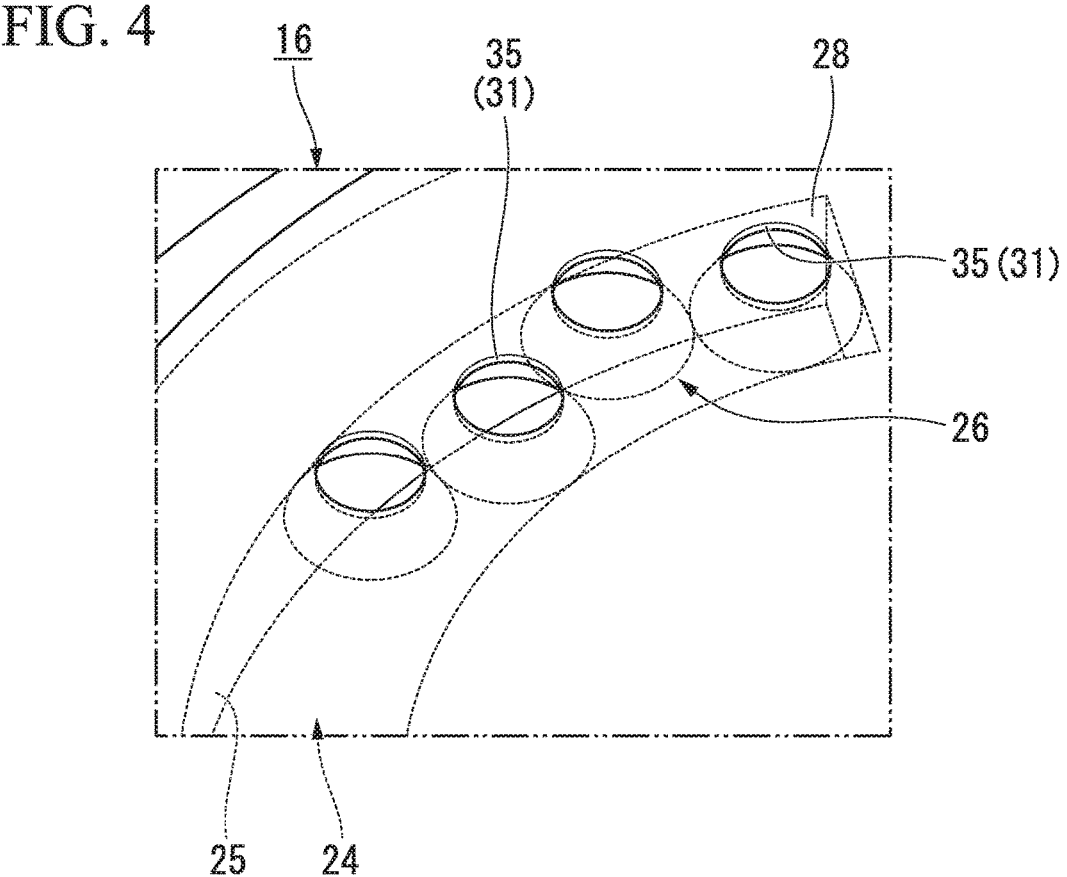
FIG. 4 is an enlarged perspective view of a main section of a partition member constituting a vibration-damping device according to a first modified example of the present invention.
Figure 5:
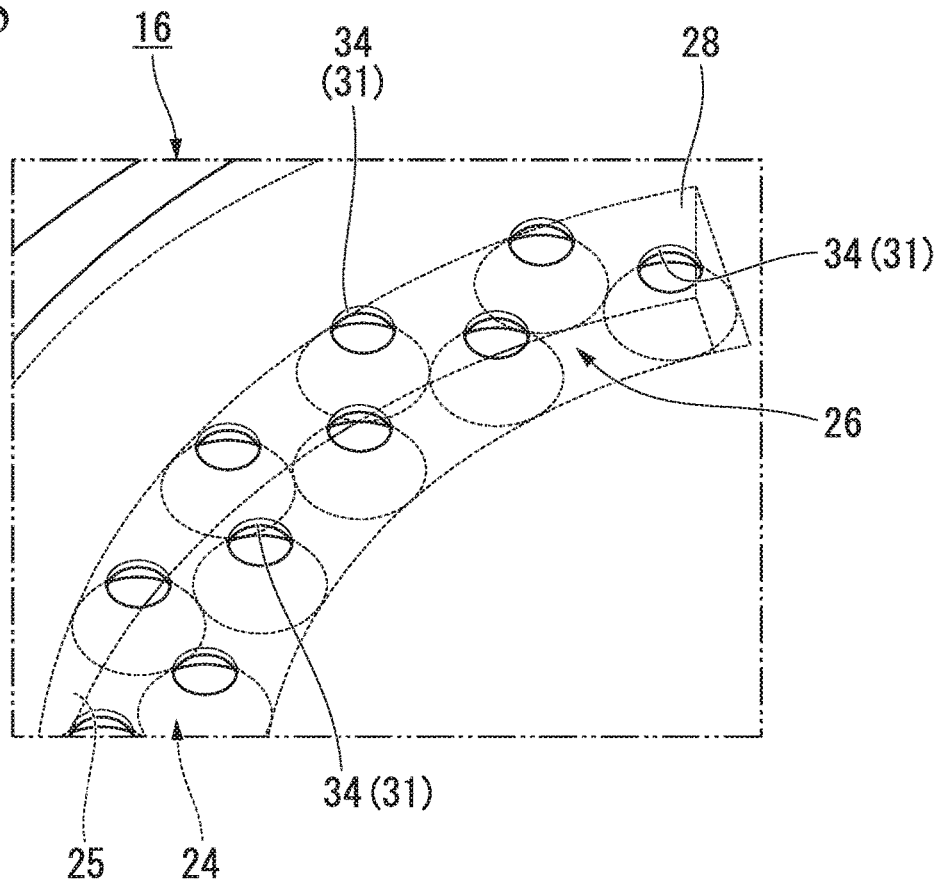
FIG. 5 is an enlarged perspective view of a main section of a partition member constituting a vibration-damping device according to a second modified example of the present invention.
Figure 6:
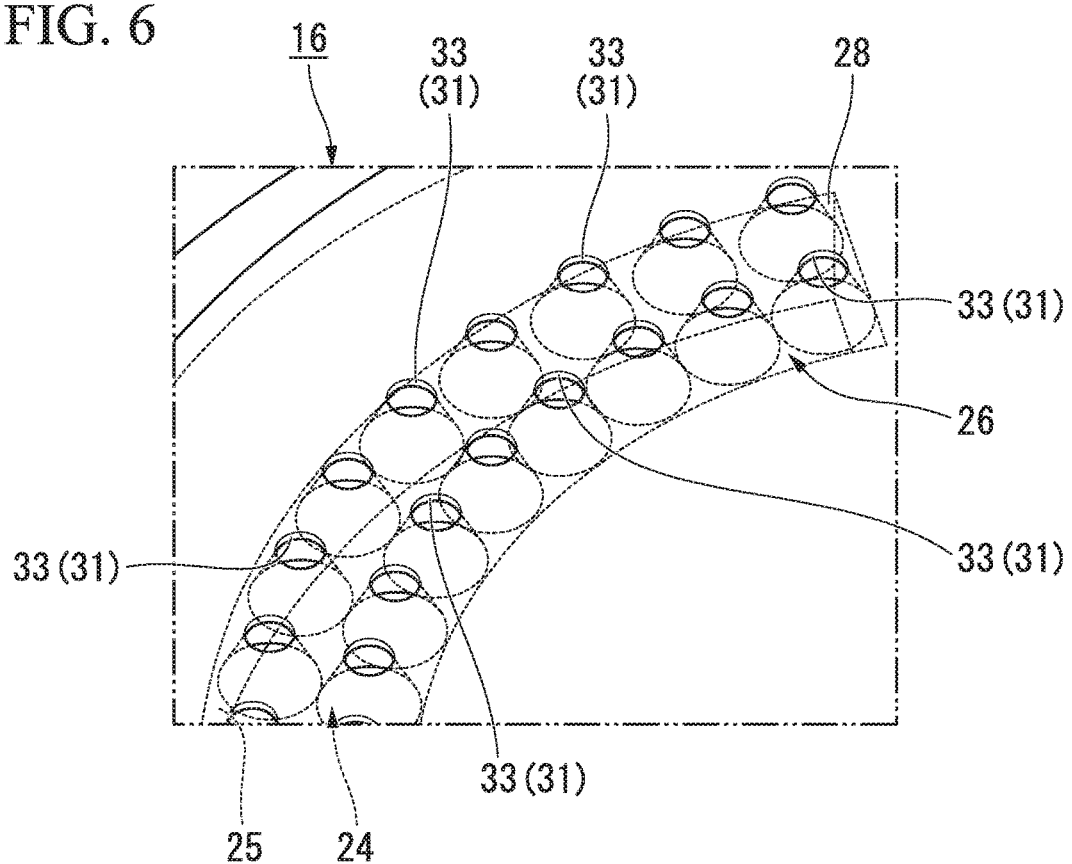
FIG. 6 is an enlarged perspective view of a main section of a partition member constituting a vibration-damping device according to a third modified example of the present invention.

For example, vibration-damping devices according to a first modified example to a third modified example shown in FIGS. 4 to 6 can be adopted. Even in any of these vibration-damping devices, first openings 31 are formed to have the same shape and the same size. In the vibration-damping device according to the first modified example shown in FIG. 4, all of the first openings 31 are formed as large diameter openings 35. The large diameter openings 35 are disposed in the circumferential direction (a passage direction of a main body passage 25) and are disposed in a zigzag form in which positions thereof change in the radial direction. In the vibration-damping device according to the second modified example shown in FIG. 5, all of the first openings 31 are formed as medium diameter openings 34. In the vibration-damping device according to the third modified example shown in FIG. 6, all of the first openings 31 are formed as small diameter openings 33.

Also, although the first openings 31 are formed to have the truncated cone shapes having diameters which gradually decrease from the main body passage 25 toward the main liquid chamber 14 in the embodiment, the first openings 31 may be formed in a cylindrical shape (a straight circular hole shape) or the like. In addition, although the minimum values of the flow path cross-sectional areas of all of the first openings 31 are set to be 25 mm² or less in the above-described embodiment, a minimum value of a flow path cross-sectional area of at least one of the first openings 31 may be appropriately changed to have another form in which the minimum value thereof is set to be 25 mm² or less.

Although the first openings 31 are formed to have the circular shapes in the plan view in which the partition member 16 is viewed from the axial direction in the above-described embodiment, the present invention is not limited thereto. For example, the first openings 31 can be formed to have a polygonal shape and formed to have a long hole shape in the above-described plan view.

Although the first communication section 26 includes the first openings 31 in the above-described embodiment, the present invention is not limited thereto. For example, the second communication section 27 may include second openings 32 disposed in the circumferential direction (the passage direction of the main body passage 25). In addition, although the main body passage 25 is disposed to extend in the circumferential direction in the above-described embodiment, the present invention is not limited thereto.

In the above-described embodiment, the partition member 16 is disposed on the lower end portion of the first attachment member 11, and the flange section 22 of the partition member 16 abuts the lower end surface of the first attachment member 11. However, for example, the partition member 16 may be disposed sufficiently above the lower end surface of the first attachment member 11, and the diaphragm 20 may be arranged on the lower side of the partition member 16, that is, the lower end portion of the first attachment member 11, so that the sub-liquid chamber 15 may be formed from the lower end portion of the first attachment member 11 to the bottom surface of the diaphragm 20.

Although the compression type vibration-damping device 10 in which a support load acts on the vibration-damping device so that a positive pressure acts on the main liquid chamber 14 has been described in the above-described embodiment, the present invention can also be applied to a suspended vibration-damping device in which the main liquid chamber 14 is attached to and located on a lower side of the vibration-damping device in the vertical direction, a sub-liquid chamber 15 is attached to and located on an upper side thereof in the vertical direction, and a support load acts on the vibration-damping device so that a negative pressure acts on the main liquid chamber 14.

Although the partition member 16 partitions the liquid chamber 19 in the first attachment member 11 into the main liquid chamber 14 having the elastic body 13 as a part of the wall surface thereof and the sub-liquid chamber 15 in the above-described embodiment, the present invention is not limited thereto. For example, a pair of elastic bodies 13 may be provided in the axial direction instead of the diaphragm 20 being installed, and a pressure receiving liquid chamber having the elastic body 13 as a part of a wall surface thereof may be provided instead of the sub-liquid chamber 15 being installed. For example, the partition member 16 may partition the liquid chamber 19 in the first attachment member 11 in which the liquid L is sealed into the first liquid chamber 14 and the second liquid chamber 15 such that at least one of the first liquid chamber 14 and the second liquid chamber 15 has the elastic body 13 as a part of a wall surface thereof.

The vibration-damping device 10 according to the present invention is not limited to an engine mount of a vehicle, and can also be applied to something other than the engine mount. For example, the present invention can also be applied to mounts of electric generators mounted in construction machines or can also be applied to mounts of machines installed in factories and the like.

In addition, the constituent elements of the above-described embodiments can be appropriately replaced with known constituent elements without departing from the spirit of the present invention, and the above-described modified examples may be appropriately combined.

Next, two verification tests such as a first verification test and a second verification test, with respect to the above-described actions and effects were conducted.

(First Verification Test)

In the first verification test, magnitudes of shock waves generated in the liquid L when a load was input to the vibration-damping device and propagating to the first attachment member 11 were measured. The magnitudes of the shock waves propagating to the first attachment member 11 were measured so that magnitudes of a generated abnormal noise could be confirmed. In other words, louder abnormal noise was generated when a magnitude of a shock wave was larger.

Figure 7:
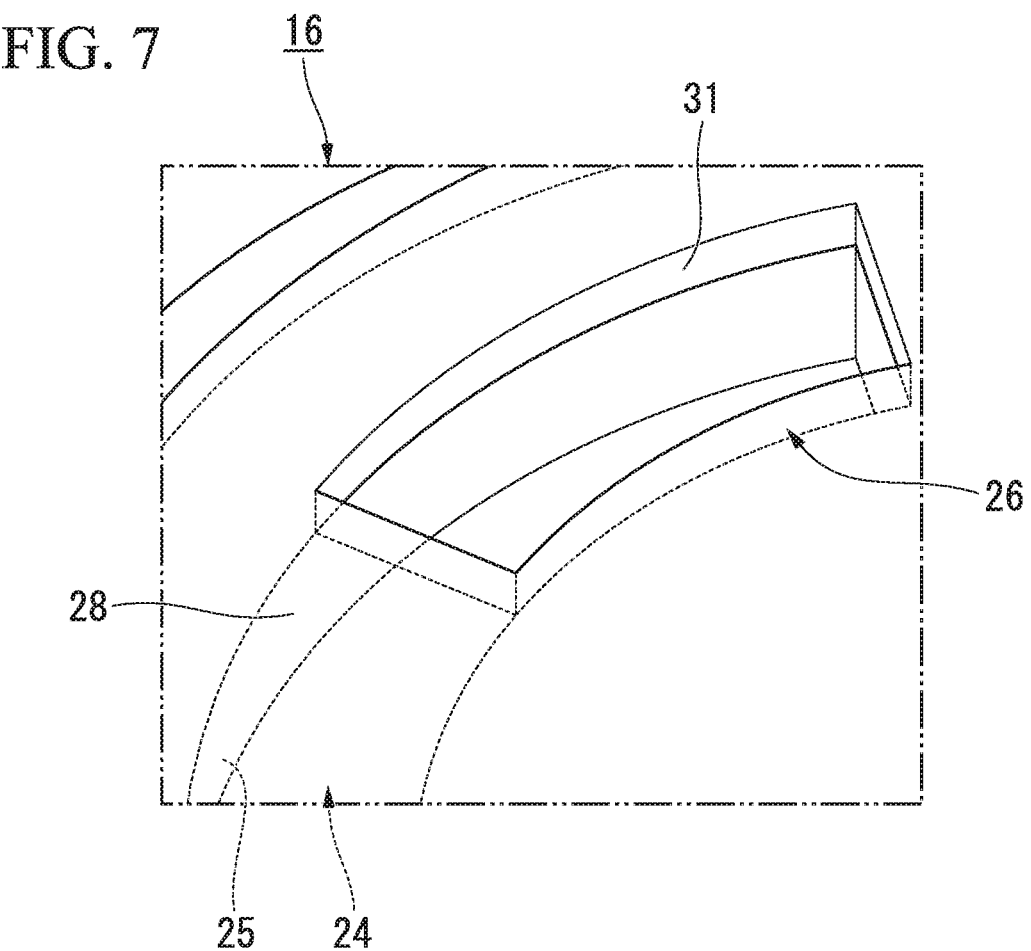
FIG. 7 is an enlarged perspective view of a main section of a partition member constituting a vibration-damping device according to a comparative example adopted for a first verification test of the present invention.

In the first verification test, vibration-damping devices of Comparative Example 1 and Examples 1 to 3 were prepared. In Comparative Example 1 and Examples 1 to 3, first communication sections 26 were provided to be different from each other, and the same constitutions as FIGS. 1 to 3 were adopted for the constitutions other than the first communication sections 26. In Comparative Example 1, as the first communication section 26, one first opening 31 having the same magnitude as the main body passage 25 in the radial direction was provided, as shown in FIG. 7. Example 1 was the vibration-damping device according to the first modified example shown in FIG. 4, Example 2 was the vibration-damping device according to the second modified example shown in FIG. 5, and Example 3 was the vibration-damping device according to the third modified example shown in FIG. 6. Note that the sums of flow path cross-sectional areas of all of the first openings 31 in the vibration-damping devices were the same regardless of the vibration-damping devices.

A vibration having an amplitude of ±5 mm and a frequency of 10 Hz was input to the vibration-damping devices of Comparative Example 1 and Examples 1 to 3, and hydraulic pressures of the main liquid chambers 14 and accelerations of shock waves propagating to the first attachment members 11 were measured.

The measured results are illustrated in graphs of FIGS. 8 to 11. In vertical axes and horizontal axes of all of the graphs shown in FIGS. 8 to 11, item names and scales are common, and item names of graph lines in the graphs are common. The horizontal axis of each of the graphs represents time, which refers to a time elapsed from the left side toward the right side. A first vertical axis (a left vertical axis) of each of the graphs represents an acceleration of a shock wave propagating to the first attachment member 11. The first vertical axis has a center in a vertical direction of 0, and an upper side of the center is positive and a lower side of the center is negative. A second vertical axis (a right vertical axis) of each of the graphs represents the hydraulic pressure of the main liquid chamber 14. The second vertical axis has a center in the vertical direction of 0, and an upper side of the center is positive and a lower side of the center is negative. In each of the graphs, a graph line L1 of a solid line represents a time-dependent change in acceleration of the shock wave propagating to the first attachment member 11, and the first vertical axis is adopted as the vertical axis. In each of the graphs, a graph line L2 of a dotted line represents a time-dependent change in the hydraulic pressure of the main liquid chamber 14, and the second vertical axis is adopted as the vertical axis.

Figure 8:
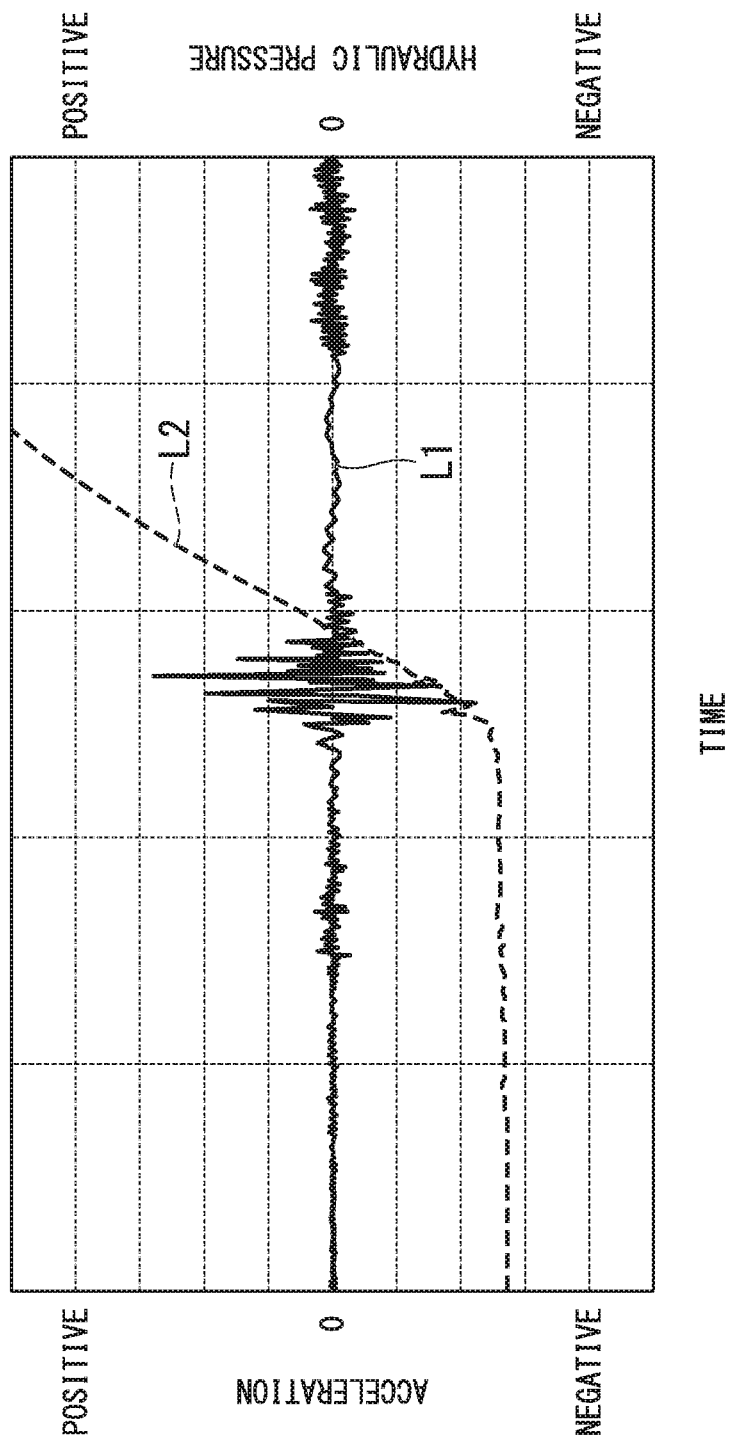
FIG. 8 is a graph for describing test results of the vibration-damping device according to the comparative example adopted for the first verification test of the present invention.
Figure 9:
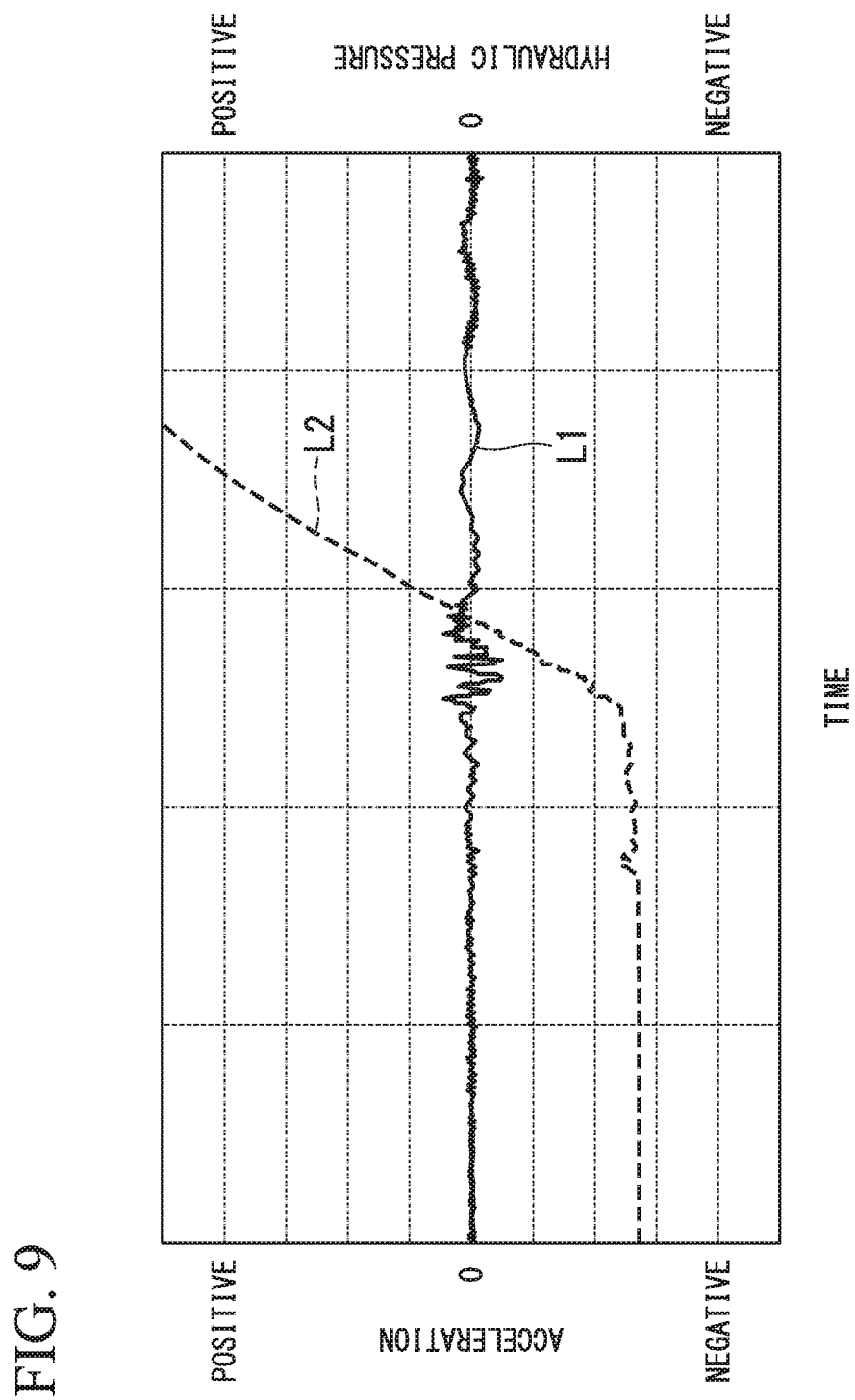
FIG. 9 is a graph for describing test results of a vibration-damping device according to Example 1 adopted for the first verification test of the present invention.
Figure 10:
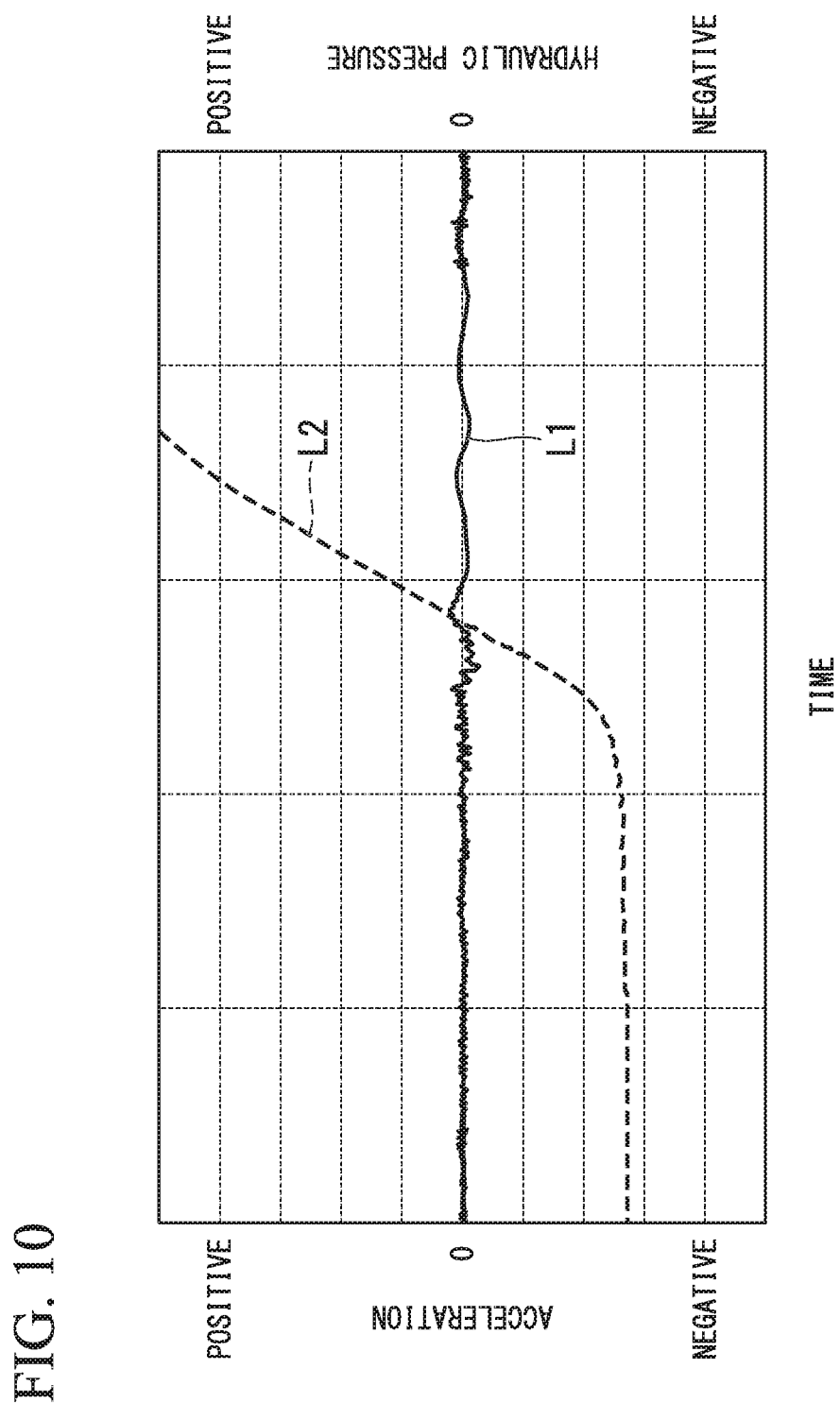
FIG. 10 is a graph for describing test results of a vibration-damping device according to Example 2 adopted for the first verification test of the present invention.
Figure 11:
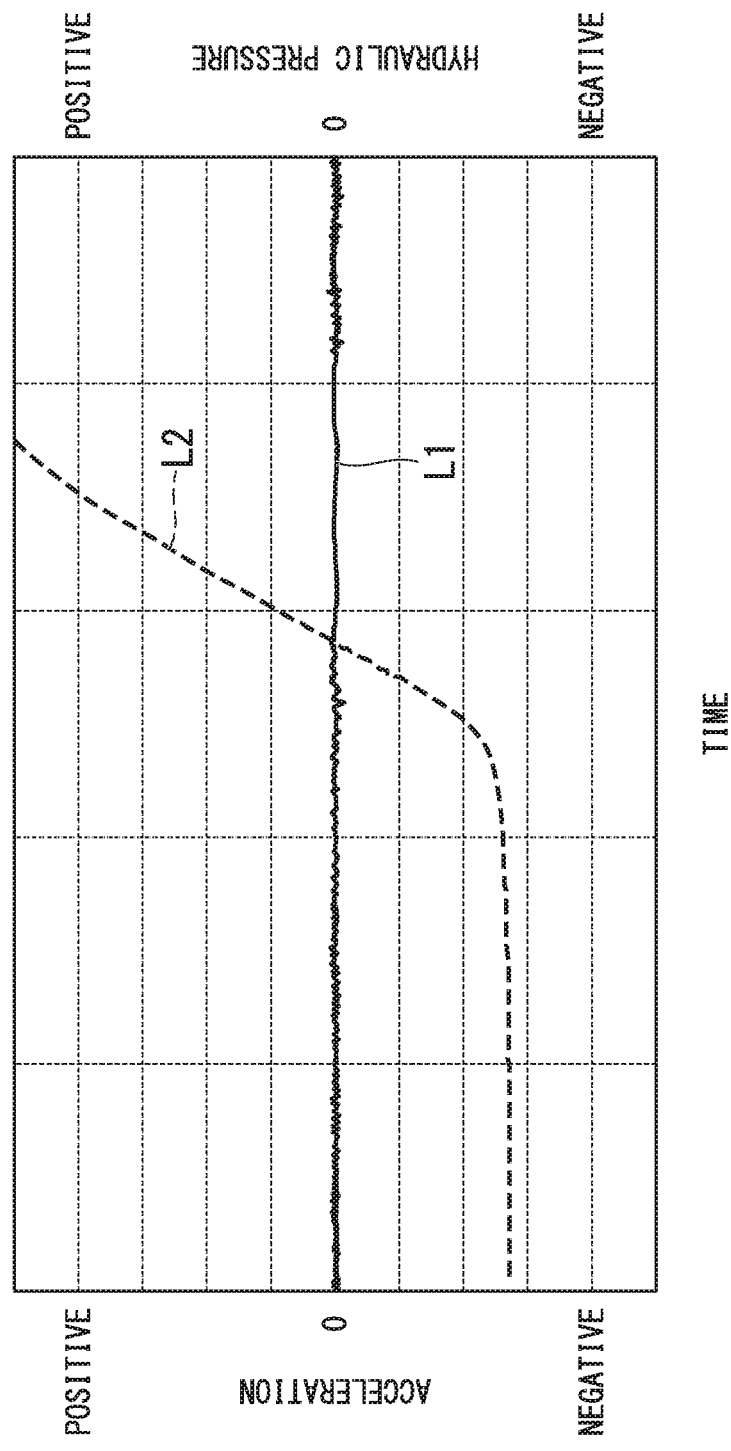
FIG. 11 is a graph for describing test results of a vibration-damping device according to Example 3 adopted for the first verification test of the present invention.

Focusing on the graph of FIG. 8 according to Comparative Example 1 among the graphs of FIGS. 8 to 11, it can be seen that a large shock wave propagated to the first attachment member 11 along with a change in the hydraulic pressure of the main liquid chamber 14 seen in a central portion of the horizontal axis. On the other hand, focusing on the graphs of FIGS. 9 to 11 according to Example 1 to 3, a change in the hydraulic pressure with the same magnitude as the change in the hydraulic pressure in Comparative Example 1 was seen in the main liquid chamber 14, but it can be seen that the magnitude of the shock wave propagating to the first attachment member 11 was suppressed to be small.

(Second Verification Test)

In a second verification test as well, like in the first verification test, magnitudes of shock waves generated in liquids L when loads were input to vibration-damping devices and propagating to the first attachment members 11 were measured.

In the second verification test, seven types of vibration-damping devices of Comparative Example 2 and Examples 4 to 9 were prepared. In seven such types of vibration-damping devices, the first communication sections 26 were provided to be different from each other, and the same constitutions as FIGS. 1 to 3 were adopted for the constitution other than the first communication sections 26. In Comparative Example 2, as the first communication section 26, one first opening 31 was provided, as shown in FIG. 7. In Comparative Example 2, a minimum value of a flow path cross-sectional area of the first opening 31 was set to be 173 mm$^2$. In Examples 4 to 9, as the first communication sections 26, the first openings 31 having the same shape and magnitude were provided. In Examples 4 to 9, minimum values of flow path cross-sectional areas of the first openings 31 were set to be 2 mm$^2$, 5 mm$^2$, 8 mm$^2$, 13 mm$^2$, 17 mm$^2$, and 25 mm$^2$, respectively. Note that the sums of the flow path cross-sectional areas of all of the first openings 31 in the vibration-damping devices were equal to each other regardless of the vibration-damping devices.

Also, single waves or actual motion waves were input to the vibration-damping devices of Comparative Example 2 and Examples 4 to 9, and accelerations of shock waves propagating to the first attachment members 11 were measured. Note that the single waves are ideal vibrations realized by combining sine waves (sin waves), and the actual motion waves are vibrations obtained by realizing an actual travel situation.

Figure 12:
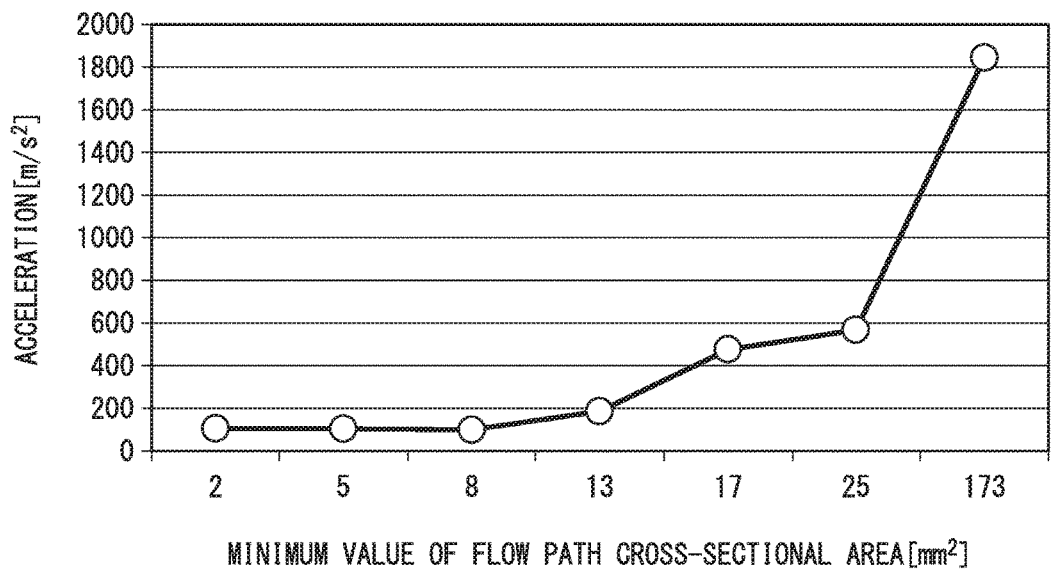
FIG. 12 is a graph for describing test results when a single wave is input to a vibration-damping device in a second verification test of the present invention.
Figure 13:
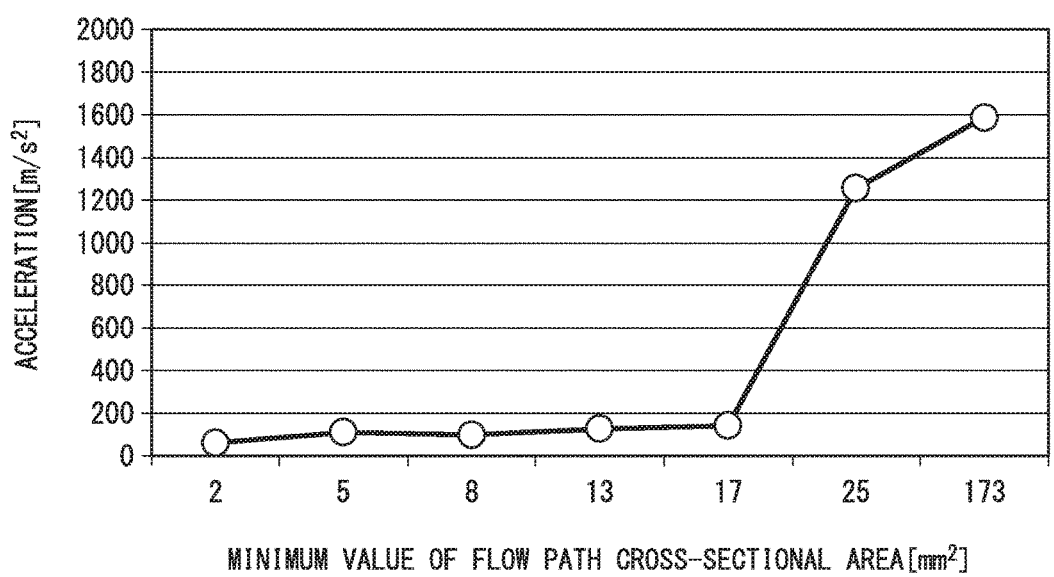
FIG. 13 is a graph for describing test results when an actual motion wave is input to the vibration-damping device in the second verification test of the present invention.

The measured results are illustrated in graphs of FIGS. 12 and 13. The graph shown in FIG. 12 illustrates the results when the single waves were input, and the graph shown in FIG. 13 illustrates the results when the actual motion waves were input. In vertical axes and horizontal axes of all of the graphs shown in FIGS. 12 and 13, item names are common. The horizontal axis of each of the graphs represents a minimum value of a flow path cross-sectional area of each of the first openings 31. The vertical axis of each of the graphs represents an acceleration of a shock wave propagating to each of the first attachment members 11.

Focusing on the graph of FIG. 12, it can be seen that, when the single wave was input, propagation of the shock wave to the first attachment member 11 was effectively suppressed when a minimum value of a flow path cross-sectional area of the first opening 31 was 25 mm$^2$ or less. Focusing on the graph of FIG. 13, it can be seen that, when the actual motion wave was input, propagation of the shock wave to the first attachment member 11 was effectively suppressed when the minimum value of the flow path cross-sectional area of the first openings 31 was 17 mm$^2$ or less.

INDUSTRIAL APPLICABILITY

According to the present invention, generation of an abnormal noise due to a cavitation collapse can be suppressed without degrading vibration-damping characteristics by using a simple structure.

REFERENCE SIGNS LIST

10 Vibration-damping device
11 First attachment member
12 Second attachment member
13 Elastic body
14 Main liquid chamber (first liquid chamber)
15 Sub-liquid chamber (second liquid chamber)
16 Partition member
19 Liquid chamber
24 Limiting passage
25 Main body passage
26 First communication section
27 Second communication section
28 First wall
29 Second wall
31 First opening (opening)
1 Liquid

The invention claimed is:

1. A liquid-tight vibration-damping device which includes:
 a tubular first attachment member joined to one of a vibration generating section and a vibration receiving section;
 a second attachment member joined to the other of the vibration generating section and the vibration receiving section;

an elastic body configured to elastically join the first attachment member and the second attachment member;

a partition member configured to partition a liquid chamber in the first attachment member in which a liquid is sealed into a first liquid chamber and a second liquid chamber; and a limiting passage formed in the partition member and configured to communicate the first liquid chamber and the second liquid chamber, wherein, the limiting passage includes:

a main body passage, an entirety of the main body passage extending inside the partition member in a circumferential direction around an axial center of the vibration-damping device and defined by a first wall of the partition member which faces the first liquid chamber and a second wall thereof which faces the second liquid chamber;

a first communication section configured to communicate the main body passage and the first liquid chamber; and a second communication section configured to communicate the main body passage and the second liquid chamber, at least one of the first communication section and the second communication section passes through the first wall or the second wall and has openings disposed in the circumferential direction, and the openings include a first set of openings positioned at a first position in a radial direction of the partition member, and the openings further include a second set of openings positioned at a second position in the radial direction of the partition member, and the second position, that includes the second set of openings, being located further away in the radial direction from a center of the partition member than the first position that includes the first set of openings.

2. The liquid-tight vibration-damping device according to claim 1, wherein a minimum value of a flow path cross-sectional area of at least one of the openings is 25 mm$^2$ or less.

3. The liquid-tight vibration-damping device according to claim 1, wherein the first communication section has first openings passing through the first wall as the openings, and
diameters of the first openings gradually decrease toward the first liquid chamber.

4. The liquid-tight vibration-damping device according to claim 1, wherein the first communication section has first openings passing through the first wall as the openings, and
minimum values of flow path cross-sectional areas of the first openings gradually increase as the first openings recede from the second communication section in the passage direction.

5. The liquid-tight vibration-damping device according to claim 1, wherein the first set of openings and the second set of openings are alternately positioned in the passage direction.

6. The liquid-tight vibration-damping device according to claim 1, wherein the first set of openings and the second set openings are alternately positioned in a zigzag shape in the passage direction.

7. The liquid-tight vibration-damping device according to claim 1, wherein the first set of openings and the second set of openings are disposed on at least one of a portion of the first wall and a portion of the second wall, the portion of the first wall forming one of end portions of the main body passage in the passage direction, and the portion of the second wall forming the other one of end portions of the main body passage in the passage direction.

* * * * *